July 26, 1955 R. C. DEHMEL 2,714,047
RECORDING APPARATUS FOR MULTIPLE COURSE TRACING
Filed Dec. 23, 1950 3 Sheets-Sheet 1

INVENTOR.
RICHARD C. DEHMEL
BY Orin R. Severn
his ATTORNEY.

July 26, 1955  R. C. DEHMEL  2,714,047
RECORDING APPARATUS FOR MULTIPLE COURSE TRACING
Filed Dec. 23, 1950  3 Sheets-Sheet 3
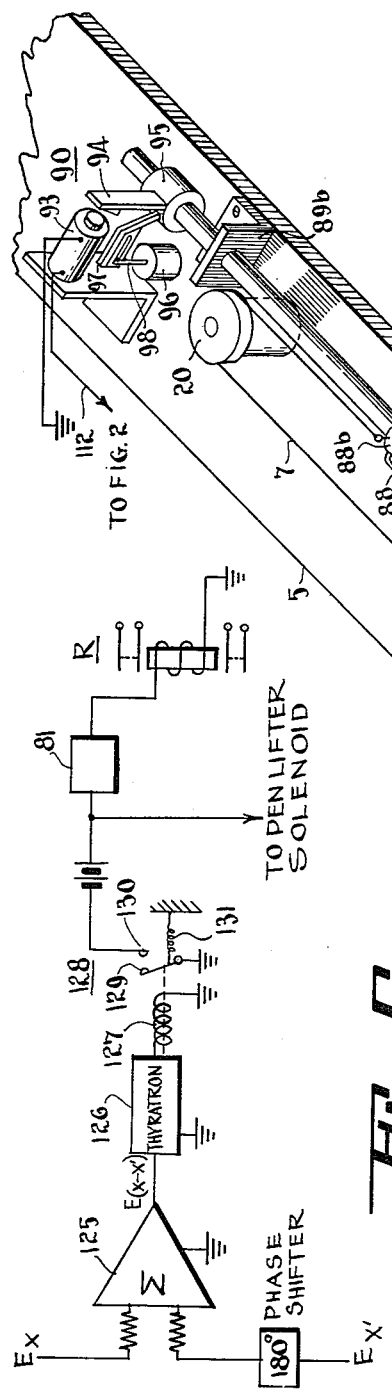
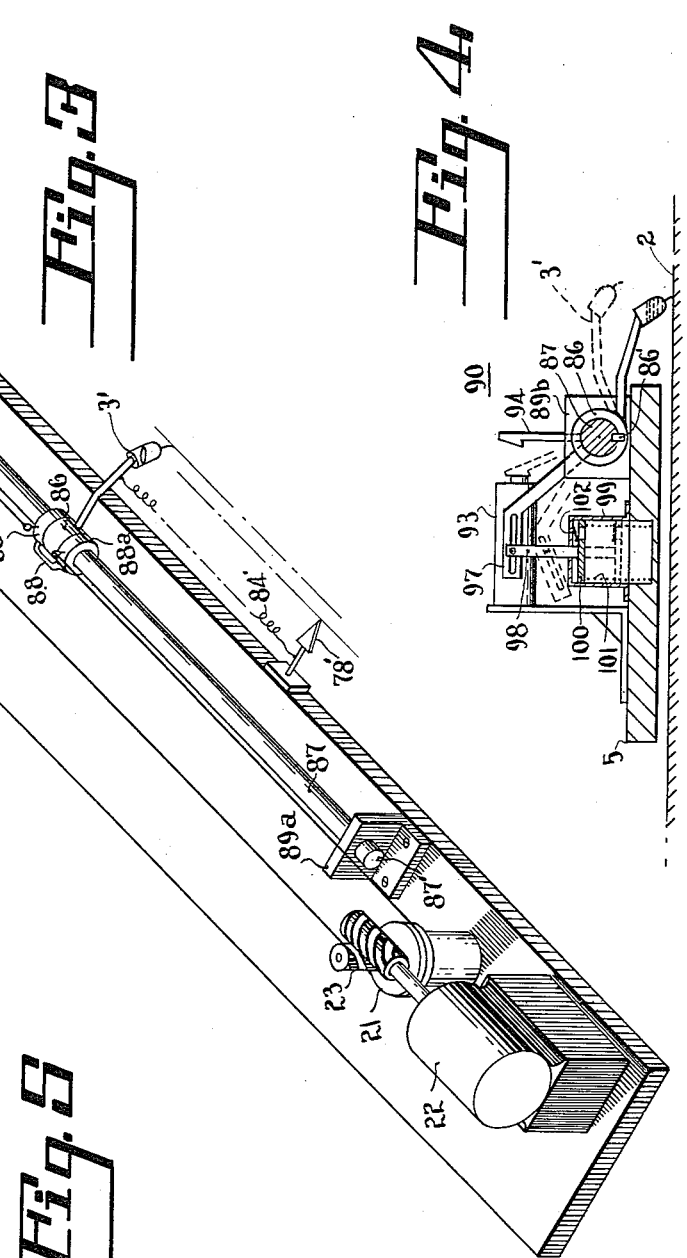
INVENTOR.
RICHARD C. DEHMEL
BY Orin R. Severn
his ATTORNEY

United States Patent Office 2,714,047
Patented July 26, 1955

2,714,047

RECORDING APPARATUS FOR MULTIPLE COURSE TRACING

Richard C. Dehmel, Short Hills, N. J.

Application December 23, 1950, Serial No. 202,456

20 Claims. (Cl. 346—8)

This invention relates to recording apparatus, and particularly to apparatus for simultaneously recording on a single chart two separate courses, such as the flight courses of target and interceptor airplanes respectively, during interception maneuvers.

It is desirable for training purposes that simulated interceptor maneuvers, for example, be recorded as the maneuver proceeds so that the instant flight position of the interceptor plane is apparent with respect to the position of the target plane. However, the simultaneous recording of two separate flight courses on the same chart involves practical problems due to possible interference of the respective course tracing pens.

A principal object of the present invention therefore is to provide improved recording apparatus that is capable of simultaneously recording without pen interference substantially continuous tracings of two intersecting courses, such as simulated flight courses, on the same chart for purposes of direct comparison.

A further object of the invention is to provide improved pen control means for precluding interference and "jamming" of the pens at the point of course interception.

In practicing the invention, each course tracing pen is subject to individual control apparatus representing a respective airplane so that separate courses may be simultaneously plotted on the same chart up to the point of course interception or course concurrence or overlap. At such a point, electrical control means is provided for switching the two pen controls so that the pen that formerly traced the course of the target plane for example now traces the course of the interceptor plane, and vice versa. Thus, as the flights proceed, the pens start moving away from each other instead of jamming or snagging and the respective recorded flight courses appear to be substantially continuous across the chart surface as though each had been made individually by a single pen.

Referring to the drawings,

Fig. 3 is an enlarged perspective view of a portion of the recording apparatus of Fig. 2 illustrating in general the pen operating mechanism;

Fig. 4 is a detail view in elevation of the pen lifting and retarding means; and Fig. 5 is a diagrammatic view of an alternative control method for operating the transfer relay and pen lifter.

The invention will be more fully set forth in the following description referring to the accompanying drawings, and the features of novelty will be pointed out with particularity in the claims annexed to and forming a part of this specification.

Figure 1:
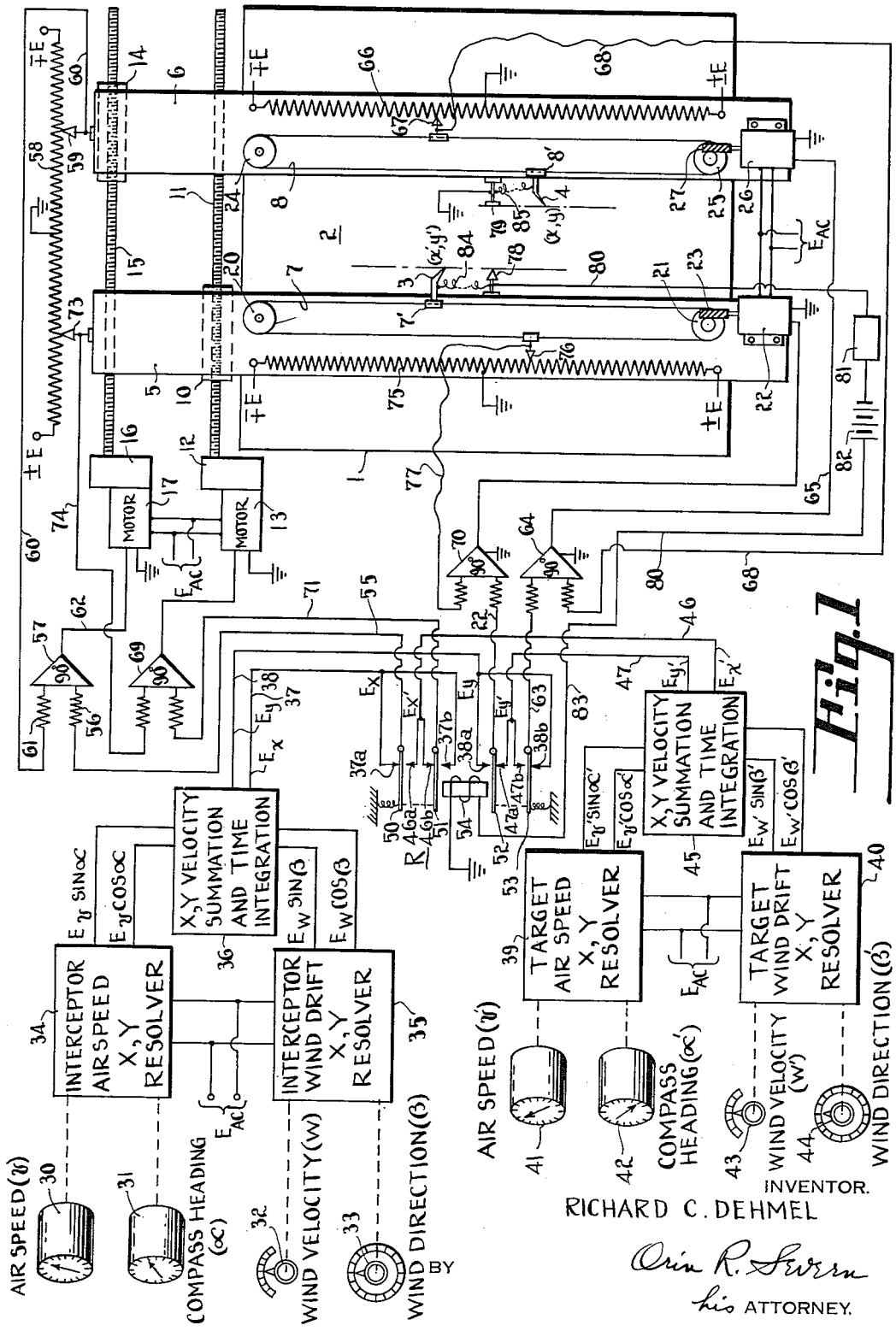
Fig. 1 is a partly diagrammatic and schematic view of recording apparatus and control means therefor embodying the invention.

Referring to Fig. 1, there is shown a chart table 1 providing a recording surface 2 that may be traversed by two separate course tracing elements such as pens 3 and 4 respectively. As previously indicated, the pen or stylus 3 may represent a target plane and the pen or stylus 4 may represent an interceptor plane. Each pen is movable along $x$ and $y$ axes of a Cartesian coordinate reference system for designating on the chart the instant simulated flight position of the respective plane. The control means for positioning each pen may be operated from suitable grounded training apparatus in response to manipulation of simulated aircraft controls, such as that disclosed by my Patent No. 2,366,603 granted January 2, 1945, for "Aircraft Training Apparatus."

In the specific arrangement disclosed, the pens 3 and 4 are carried respectively by platforms 5 and 6 that are in turn individually mounted for movement across the chart surface in the horizontal or $x$ direction, and each pen is movable on its respective platform in the vertical or $y$ direction by suitable means such as belt loops 7 and 8 respectively. Thus by joint movement of a platform and its associated belt the attached pen may be positioned to represent any assumed flight path.

For obtaining movement in the $x$ direction, the platform 5 has rigidly secured thereto an internally threaded sleeve 10 that engages a rotatable screw 11 connected through suitable reduction gearing 12 to a two-phase A. C. motor 13. Similarly, the platform 6 has secured thereto a threaded sleeve 14 that engages a rotatable screw 15 connected through reduction gearing 16 to a second two-phase A. C. motor 17. Each motor is operated in well-known manner by energizing one phase winding from a source of fixed reference voltage $E_{ac}$ and the other phase winding from a source of variable control voltage dephased 90° from the reference voltage $E_{ac}$ as hereinafter described.

For obtaining movement of the pen 3 in the $y$ direction, the pen is suitably attached as indicated at 7' to the belt 7 and the belt is in turn mounted on pulleys 20 and 21 rotatably supported on the platform 5. The pulley 21 constitutes the drive wheel of the belt and is connected to a two-phase A. C. motor 22 through suitable gearing, such as a worm gear drive indicated at 23. Similarly, the pen 4 is attached to the belt 8 at 8' which is guided on pulleys 24 and 25 carried by the platform 6, and the pulley 25 is driven from a two-phase A. C. motor 26 through gearing 27. The motors 22 and 26 are operated in the manner above described from a source of fixed reference voltage $E_{ac}$ and respective sources of variable control voltage dephased 90° with respect to the reference voltage. Thus, the pen 3 may be positioned according to the respective $x$ and $y$ control voltages applied to the motors 13 and 22 as hereinafter described, and the pen 4 may be positioned according to the respective $x$ and $y$ control voltages applied to the motors 17 and 26.

The aforesaid $x$ and $y$ control voltages can be derived according to simulated airspeed, compass heading and wind drift of the respective flights by suitable computing apparatus such as that disclosed by my Patent No. 2,475,314 granted July 5, 1949, for "Navigation Apparatus for Aircraft and Training Devices," and a block schematic illustration thereof will be sufficient for the purposes of the present invention.

Assuming now that the interceptor plane is operated at a simulated airspeed $v$ and a compass heading $\alpha$ as represented by the simulated flight instruments 30 and 31, and that the assumed wind velocity and direction are $\omega$ and $\beta$ respectively as represented by the adjustable dials 32 and 33, the position voltages $E_x$ and $E_y$ can be derived as disclosed in my aforesaid Patent No. 2,475,314 by (1) resolving a voltage representing the plane velocity vector into its $x$ and $y$ components $v \sin \alpha$ and $v \cos \alpha$ respectively by a resolver 34 adjustable as indicated according to the indications of instruments 30 and 31, (2) resolving a voltage representing the wind velocity vector into its $x$ and $y$ components $\omega \sin \beta$ and $\omega \cos \beta$ respectively by a resolver 35 adjustable as indicated according to the positions of the dials 32 and 33, (3) summing as indicated at 36 the $x$ component voltages of plane and wind velocity and summing the $y$ component voltages of plane and wind velocity and (4) integrating with respect to time the resulting summed $x$ and $y$ voltages to obtain the instant position voltages $E_x$ and $E_y$ at the output conductors 37 and 38 for representing the interceptor location. The polarity or phase relationship of the $x$ and $y$ voltages depends on the particular reference system quadrant in which the simulated flight is located as described in my aforesaid Patent No. 2,475,314. The resolvers 34 and 35 are energized as indicated by the reference A. C. voltage $E_{ac}$.

Similarly, the target position voltages $E_{x'}$ and $E_{y'}$ are obtained by resolving into $x$ and $y$ components voltages representing the target plane velocity and wind-drift vectors at resolvers 39 and 40 in accordance with respective indications of the simulated flight instruments 41 and 42 of the target plane and the settings of the wind drift dials 43 and 44, and summing and integrating the respective $x$ and $y$ component voltages at 45 to produce at the output conductors 46 and 47 the coordinate voltages $E_{x'}$ and $E_{y'}$ representing the instant position of the target plane. The position voltages $E_{x'}$, $E_{y'}$ and $E_x$, $E_y$ thus provided are balanced against potentiometer "answer" voltages each determined as presently described according to the respective instant pen position for determining change in position of the respective $x$ and $y$ pen positioning motors thereby charting the target and interceptor flight courses.

For the purpose of controlling the aforesaid pen positioning motors so that there will be not interference between the pens 3 and 4 or their carriers, a relay R is provided for switching the position voltages whereby the motors formerly energized by the interceptor position voltages $E_x$ and $E_y$ are now energized by the target position voltages $E_{x'}$ and $E_{y'}$, and vice versa. The relay as shown is in the deenergized position wherein the relay transfer contacts 50, 51, 52 and 53 are biased in opposition to the attracting force of the relay solenoid 54. The contacts 50 and 51 are gang-operated as indicated, as are also contacts 52 and 53. In this position the position voltages $E_x$ and $E_y$ energize the motors 17 and 26 respectively for positioning the pen 4 representing the interceptor plane, and the position voltages $E_{x'}$ and $E_{y'}$ energize the motors 13 and 22 respectively for positioning the pen 3 representing the target plane.

Specifically, the motors are energized and controlled through the following circuits: The voltage $E_x$ on conductor 3 from the integrating apparatus at 36 energizes the relay fixed contacts 37a and 37b and the voltage $E_y$ on conductor 38 energizes the relay contacts 38a and 38b, and similarly the position voltage $E_{x'}$ on conductor 46 from the integrating apparatus at 45 energizes the relay contacts 46a and 46b and the position voltage $E_{y'}$ on conductor 47 energizes the relay contacts 47a and 47b. It will thus be seen that energization of the relay coil 54 to cause attraction of the contacts 50, 51, and 52, 53 transfers the two pairs of position voltages from one set of fixed contacts to the other.

In the deenergized position of the relay shown the transfer contacts 50 connects the contact 37a through conductor 55 to the proportioning resistance 56 at the input side of an amplifier 57. This amplifier dephases the alternating current by 90° according to well-known practice for the purpose of two-phase motor operation. Another input voltage for the amplifier 57 constituting an "answer" voltage is derived from a fixed potentiometer 58 by means of a slider contact 59 carried by the platform 6 so as to correspond to the "$x$" position of the pen 4. This answer voltage is led by conductor 60 to the amplifier input resistance 61 and the resultant output voltage of the amplifier is fed by conductor 62 to the "$x$" motor 17. The potentiometer 58 has a grounded center tap for representing the zero point of the reference system and is energized by an A. C. voltage that is oppositely phased with respect to the position control voltage so that the motor 17 functions as a follow-up device for the integrating apparatus. That is, the motor 17 operates until the answer voltage equals in magnitude the oppositely phased position voltage, at which point the output of the amplifier 57 is zero and the motor is deenergized. The "$y$" motor 26 for the pen 4 is energized through relay contact 38b, transfer contact 53, conductor 63, dephasing amplifier 64 and output conductor 65. The answer voltage in this case is obtained from a potentiometer 66 with a grounded center tap mounted on the platform 6 and energized by an A. C. voltage oppositely phased from the position control voltage according to the "$y$" position of the slider contact 67. This slider contact may conveniently be carried by the belt 8 so as to move in concurrence with the $y$ movement of the pen 4 and is connected by conductor 68 to the input side of amplifier 64. Accordingly, the output of amplifier 64 energizes the "$y$" motor 26 so as to position the pen 4 to correspond with the voltage $E_y$.

In like manner the motors 13 and 22 are energized from the dephasing amplifiers 69 and 70 respectively. The voltage $E_{x'}$ at relay contact 46b is fed to the motor amplifier 69 through transfer contact 51 and conductor 71, and the voltage $E_{y'}$ at relay contact 47a, is fed to the motor amplifier 70 through transfer contact 52 and conductor 72. The "$x$" answer voltage is obtained from the fixed potentiometer 58 by means of the slider contact 73 connected to the platform 5 and is directed to amplifier 69 by conductor 74. The "$y$" answer voltage is obtained from potentiometer 75 mounted on the platform 5 and energized as previously described. The potentiometer slider contact 76 is carried by the belt 7 and is connected by conductor 77 to the input side of amplifier 70 so that the answer voltage corresponds to the $y$ coordinate position of the pen 3. Thus the pen 3 is positioned according to the voltages $E_{x'}$ and $E_{y'}$.

Assuming now that the interceptor plane is represented as closely approaching the target plane, it will be apparent that the platforms 5 and 6 are correspondingly close to each other. At some predetermined point, as where the tracing points of the pens are at or just short of touching, or are in vertical concurrence, a pair of contacts 78 and 79 carried at any convenient location by the platforms 5 and 6 respectively engage to complete a circuit including a conductor 80, a stepping device 81 (shown specifically in Fig. 2) a source of voltage 82, conductor 83 and the relay solenoid coil 54 to cause energization of the relay and attraction of the relay transfer contacts.

By this proximity or sensing control operation the relay transfer contacts which are connected as above described to the respective amplifiers switch the $E_x$ and $E_y$ voltages to the energizing circuits of motors 13 and 22, and the $E_{x'}$ and $E_{y'}$ voltages to the energizing circuits of motors 17 and 26, thus interchanging the functions of the pens 3 and 4 and reversing the movements of the platforms to represent crossing of the flight paths. The pens are thereby caused to recede from each other to trace apparently continuous courses. The necessary vertical or "$y$" adjustment of the respective pens for the reversed positions is ordinarily small and may be accomplished in a brief time since the courses of the interceptor and target planes usually cross when the planes are comparatively near each other.

For insuring control transfer in case of actual contact between the pens themselves, the pens 3 and 4 which may be of suitable conducting material are electrically connected by flexible connectors 84 and 85 respectively to the corresponding platform contacts 78 and 79. The latter contact is suitably grounded as indicated. In order to prevent premature retransfer of the control upon separation of the contacts 78 and 79, a stepping device 81, shown in detail in Fig. 2 and described later, functions to hold the relay coil 54 energized until the next contact is made.

Assuming now that the interceptor plane after crossing the path of the target plane so as to cause transfer of control reverses its course and makes a second "pass" at the target plane, the subsequent engagement of contacts 78 and 79 causes through the stepping device 81 deenergization of the relay R and retransfer of the circuits to the positions shown in Fig. 1.

Figure 2:
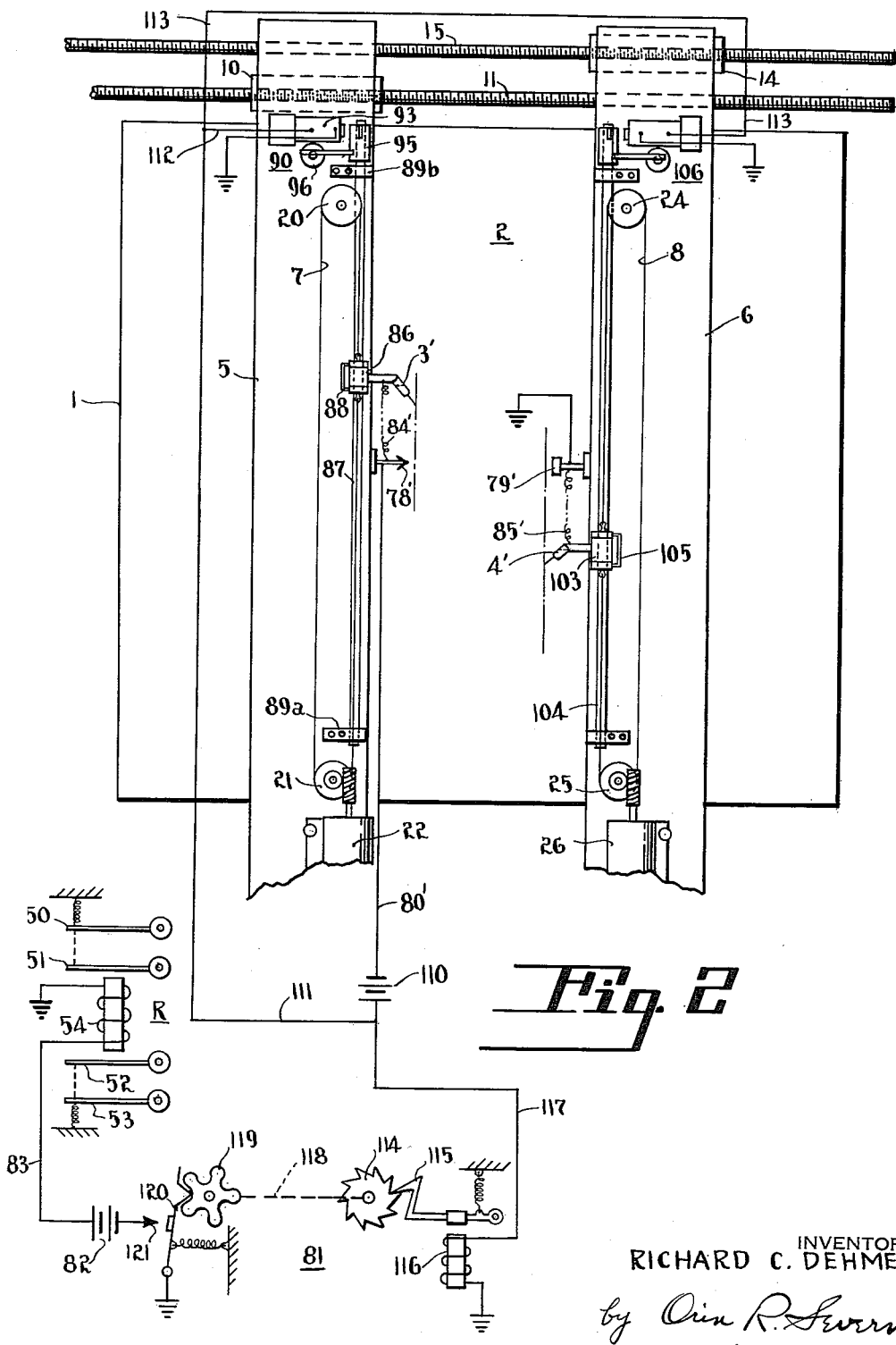
Fig. 2 is a partial view of a modified form of the recording apparatus of Fig. 1.

Referring now to Fig. 2, there is shown a modified form of the sensing means of the invention wherein the pens 3' and 4' overlap somewhat the respective platform contacts 78' and 79' so that the contacts do not engage until the pens have passed each other. The overlap shown is exaggerated for purposes of illustration and the object is to minimize oscillation of reversal in the special case where the pens are close together and tracking in a north-south (or $y$) direction. The above-described overlap however introduces the possibility of pen jamming or snagging where the courses, especially when in the north-south direction, intersect at close range. In order to overcome this difficulty and also to minimize unnecessary vertical tracing due to pen adjustment during the transfer operation, there is provided according to the invention means for lifting the pens from the chart for a brief period. For example, one pen may be lifted slightly to avoid making a trace on the chart and the other may be lifted sufficiently to clear the first pen.

In the specific arrangement shown, referring to Figs. 2, 3 and 4, the pen 3' is carried by a sleeve 86 that is mounted on and keyed to a splined shaft 87 so as to be slidable longitudinally along the shaft but restrained from rotation thereon. To this end the shaft 87 has a longitudinal key slot indicated at 87', Fig. 3, and the sleeve 86 is provided with a spline key 86', Fig. 4, slidable in the slot. The sleeve 86 is movable along the shaft by means of a yoke-like member 88 freely slidable and rotatable on the shaft and suitably connected to the loop 7. As shown, the yoke member comprises two interconnected rings 88a and 88b freely mounted on the shaft at opposite sides of the sleeve 86 and connected as indicated to the loop 7. Accordingly, there is no interference between the operation of the loop 7 and the rocking of shaft 87. The shaft 87 is suitably journaled in bearings 89a and 89b mounted on the platform 5 and is adaped to be rocked by a pen lifting mechanism generally indicated at 90 for raising and lowering the pen 3' with respect to the chart.

The pen lifting mechanism 90 comprises an actuating solenoid 93 suitably mounted on the platform 5 for coaction with an armature 94 forming in effect a lateral extension arm of the shaft 87. The arm may extend from a sleeve 95 rigidly secured to the shaft so that attraction of the armature by the solenoid rocks the shaft 87 to lift the pen. A retarding device, such as a dash pot 96 is also connected to the shaft through a pin and slot connection including a slotted arm 97 connected to the sleeve 95 and a rod 98 having a pin slidable in the aforesaid slotted arm for holding the armature in the attracted, i. e. pen-lifted, position for several seconds to allow the pen to move to its new "y" position during the transfer operation.

The retarding device may be of any suitable type and the dash-pot form shown for example in Fig. 4 comprises a cylinder 99 and piston 100 that is connected to the rod 98 and biased upwardly by a spring 101. The piston has a one-way valve 102 arranged so that there is minimum fluid resistance in the cylinder on the down-stroke of the piston and maximum fluid resistance on the up-stroke, thereby retarding lowering of the pen under influence of the spring 101. The raised position of the pen with corresponding armature and dash-pot positions are indicated by dotted lines in Fig. 4.

The pen 4', Fig. 2, is similarly mounted on a sleeve 103 slidable on the rock shaft 104 that in turn is carried by the platform 6. The sleeve 103 is movable along the shaft by means of a yoke member 105 that is secured to the loop 8. The shaft is adapted to be rocked for raising and lowering the pen in the manner above described by the pen-lift and retarding mechanism generally indicated at 106. In the case of pen 4' it is sufficient to lift the pen but a slight distance above the chart so that no trace is made during the transfer operation and this may be readily accomplished by shortening the armature travel.

The control circuits for the pen-lift solenoid and for the relay R are shown by Fig. 2. The pen lifting solenoids are simultaneously energized upon engagement of the platform contacts 78' and 79' (or upon actual engagement of pens 3' and 4') through a circuit extending from the grounded platform contact 79', contact 78', conductor 80', voltage source 110, conductor 111 and branch conductors 112 and 113 to the respective solenoids of the pen lifting apparatus 90 and 106. Accordingly, the pen lifting solenoids are energized each time the platform contacts (or pens) make contact.

The stepping device 81 interposed in the circuit of relay R comprises a ratchet wheel 114 and pawl 115 arranged to advance the ratchet wheel one step each time the above-described pen lifting solenoid circuit is energized. To this end the pawl 115 is arranged to be actuated by a solenoid 116 that is connected by conductor 117 to the voltage source 110 to form a branch circuit as indicated. The ratchet wheel 114 is mechanically connected at 118 to a notched switching cam 119 having half the number of high points as the number of teeth on the ratchet wheel. The cam 119 controls the position of a switch 120 for making or breaking the energizing circuit of the relay solenoid 54 at contact 121. It will be apparent from inspection that when the ratchet wheel 114 is advanced one notch by a single energization of solenoid 116 the switching cam 119 is rotated to either a high or low point causing the switch 120 either to make or break the R relay solenoid circuit. Thus the relay R is energized only in response to alternate energizations of the solenoid 116 in order to insure proper transfer of the control.

An alternate sensing method for energizing the transfer relay R and the pen lifting solenoids is shown by Fig. 5 and comprises comparing the voltages representing the $x$ coordinate values, where the platforms are arranged as shown, of the respective pen positions and energizing the transfer relay and solenoid circuits when the voltage difference is, say zero or less representing substantial concurrence or co-axial relation of the instant flight positions. In case the platforms are movable along the $y$ axis instead of the $x$ axis, the voltages representing the $y$ coordinate values would of course then be used.

In the specific arrangement shown, a summing amplifier 125 is energized by the $x$ coordinate position voltages $E_x$ and $E_{x'}$, these voltages corresponding to the voltages similarly designated in Fig. 1. A suitable phase shifting device indicated is used to reverse the phase of voltage $E_{x'}$ in opposition to $E_x$. The amplifier output $E_{(x-x')}$ represents the algebraic sum of or difference between the voltage values and this difference voltage may be in turn used to control a suitable grid-controlled discharge device 126 such as a Thyratron for example. The Thyratron is designed so that its power output is cut off when the control voltage $E_{(x-x')}$ reaches a predetermined low value, such as zero or less. The Thyratron output circuit includes the coil 127 of an under-voltage relay 128, the contacts 129 and 130 of which correspond in function to the platform carried contacts 78 and 79 of Fig. 1 (or contacts 78' and 79' of Fig. 2). The under-voltage relay 128 is held open against the tension of its spring 131 when the Thyratron is passing current but is closed by the spring when the current is cut off. Thus the transfer relay and the pen lifter circuits indicated are energized in the manner previously described upon closing of the contacts 129 and 130.

For the purposes of this specification the term "concurrence" where used in the specification and claims to define the proximity relationship of the respective courses is intended to include coexistence of the courses at a common transfer axis and not to be limited to actual merging or intersection of the courses.

It should be understood that this invention is not limited to specific details of construction and arrangement thereof herein illustrated, and that changes and modifications may occur to one skilled in the art without departing from the spirit of the invention. For example, the platform carried contacts 78 and 79 where used may be located at the respective ends of the platforms instead of intermediate the ends as shown in order to minimize the possibility of interference between the contact and the pen of the same platform.

What is claimed is:

1. Apparatus for multiple course recording comprising a chart, a plurality of recording pens for tracing respective contemporaneous courses on said chart, separate respective actuating means for said pens, means for controlling said actuating means according to respective course variations, sensing means responsive to relative positioning of said pens at concurrence or intersection of said courses, and transfer control means responsive to said sensing means, said transfer control means causing interchange of course control of said actuating means whereby the functions of said pens are interchanged.

2. Apparatus for multiple course recording comprising a chart, a plurality of recording pens for tracing respective contemporaneous courses on said chart, separate actuating means for each pen operable according to respective course variations for simultaneously charting said courses, sensing means responsive to relative positioning of said pens at concurrence or intersection of said courses, and transfer control means responsive to said sensing means, said transfer means being related to said actuating means for interchanging the course control thereof and thereby causing transfer of function from one pen to the other.

3. Apparatus for multiple course recording comprising a chart, a plurality of recording pens for tracing respective contemporaneous courses on said chart, separate actuating means for moving each pen along respective axes of a coordinate reference system, means for controlling said actuating means according to respective course variations, sensing means respective to relative positioning of said pens with respect to one of said axes, and transfer control means responsive to said sensing means, said transfer means causing interchange of course control of said actuating means whereby the functions of said pens are interchanged for precluding pen interference.

4. Apparatus for multiple course recording comprising a chart, a plurality of recording pens for tracing respective contemporaneous courses on said chart, separate electric actuating means for each pen, means for controlling said actuating means according to respective course variations, and transfer control means including circuit control means responsive to relative positions of said pens at concurrence or intersection of said courses, operation of said circuit control means in accordance with positioning of said pens causing interchange of course control of said electric actuating means whereby the functions of said pens are interchanged for precluding pen interference.

5. Apparatus for multiple course recording comprising a chart, two recording pens movable over said chart for tracing respective contemporaneous courses, motive means for each pen operable for simultaneously charting said courses, means representing course direction and velocity for controlling each motive means according to the respective course variations, sensing means responsive to relative positioning of said pens in anticipation of actual pen interference, and transfer control means responsive to said sensing means, said transfer means being associated with both said course representing means and said motive means for causing transfer of course control from one motive means to the other to reverse the functions of said pens.

6. Apparatus for multiple course recording comprising a chart, two recording pens movable over said chart for tracing respective contemporaneous courses, a pair of motive means for each pen operable for simultaneously charting said courses, each motive means being adapted to cause pen movement along a respective axis of a coordinate reference system, means representing course direction and velocity for controlling each motive means according to the respective course variations, sensing means responsive to relative positioning of said pens along one of said axes, and transfer control means responsive to said sensing means, said transfer means interrelating both said course representing means and all said motive means for causing interchange of course control to reverse the functions of said pens in anticipation of actual pen interference.

7. Apparatus for multiple course recording comprising a chart, two recording pens movable over said chart for tracing respective contemporaneous courses, motive means for each pen operable with respect to a pair of axes of a coordinate reference system for simultaneously charting said courses, means representing course direction and velocity for controlling each motive means according to the respective course variations and transfer control means responsive to proximity positions of said pens along one of said axes in anticipation of actual pen interference, said transfer means including a relay interrelating both said course representing means and said motive means for causing interchange of course control from one motive means to the other to reverse the functions of said pens.

8. Apparatus for multiple course recording comprising a chart, a plurality of recording pens for tracing respective contemporaneous courses on said chart, actuating means for each pen operable according to respective course variations for simultaneously charting said courses, a transversely movable carrier for each pen, sensing means responsive to proximity positioning of said pen carriers at concurrence or intersection of said courses, and transfer control means responsive to said sensing means, said transfer means being related to said actuating means for interchanging the course control thereof and thereby causing transfer of function from one pen to the other.

9. Apparatus for multiple course recording comprising a chart, a plurality of recording pens for tracing respective contemporaneous courses on said chart, actuating means for each pen operable according to respective course variations for simultaneously charting said courses, sensing means responsive to relative positioning of said pens at concurrence or intersection of said courses, transfer control means responsive to said sensing means, said transfer means being related to said actuating means for interchanging the course control thereof and thereby causing transfer of function from one pen to the other, and means also responsive to said sensing means for lifting one of said pens during the control transfer to insure pen clearance.

10. In multiple course recording apparatus having a chart and a plurality of course tracing pens, operating means for each pen comprising a pen carrier, motive means for moving said carrier with respect to said chart along one axis of a Cartesian coordinate reference system, motive means for moving said pen with respect to said carrier along another axis of said system, means for energizing the respective motive means according to representations of course direction and velocity, sensing means responsive to predetermined proximity of said pen carriers, and transfer control means responsive to said sensing means for interchanging the course control of said motive means and reversing the course tracing functions of said pens.

11. In multiple course recording apparatus having a chart and a plurality of course tracing pens, operating means for each pen comprising a pen carrier, electric motive means for moving said carrier with respect to said chart along one axis of a Cartesian coordinate reference system, electric motive means for moving said pen with respect to said carrier along another axis of said system, means for energizing the respective electric motive means according to representations of course direction and velocity, electric circuit control means mounted on said carriers operable in accordance with predetermined proximity of said pen carriers, and transfer control means including a switching relay responsive thereto for interchanging the course control of said motive means and reversing the course tracing functions of said pens.

12. Apparatus for multiple course recording comprising a chart, a plurality of recording pens for tracing respective contemporaneous courses on said chart, actuating means for said pens, means for controlling said actuating means according to respective course variations, control means responsive to proximity positions of said pens at concurrence or intersection of said courses, and transfer means responsive thereto for causing interchange of course control of said actuating means whereby the functions of said pens are interchanged for precluding pen interference, said control means including means for energizing said transfer means in accordance with alternate approach of said pens to a proximity position so as to maintain substantially continuous course tracing.

13. In multiple course recording apparatus having a chart and a plurality of course tracing pens, operating means for each pen comprising a pen carrier, electric motive means for moving said carrier with respect to said chart along one axis of a Cartesian coordinate record system, electric motive means for moving said pen with respect to said carrier along another axis of said system, means for energizing the respective electric motive means according to representations of course direction and velocity, electric switch contacts mounted on said carriers respectively for operating a control circuit in accordance with predetermined proximity of said pen carriers, said switch contacts adapted to engage upon limited overlap of said pens, and transfer switching means responsive to the operation of said switch contacts for interchanging the course control of said motive means and reversing the course tracing functions of said pens.

14. In multiple course recording apparatus having a chart and a plurality of course tracing pens, operating means for each pen comprising motive means, means for energizing the respective motive means according to representations of course direction and velocity, sensing means for operating control apparatus in accordance with relative positioning of said pens at concurrence or intersection of said courses, transfer means responsive thereto for interchanging the course control of said motive means and reversing the course tracing functions of said pens, means also responsive to said sensing means for lifting one of said pens from the chart so as to clear the other pen, and retarding means for delaying the lowering of said lifted pen during said control transfer.

15. In multiple course recording apparatus having a chart and a plurality of course tracing pens, operating means for each pen comprising a pen carrier, electric motive means for moving said carrier with respect to said chart along one axis of a Cartesian coordinate reference system, electric motive means for moving said pen with respect to said carrier along another axis of said system, means for energizing the respective electric motive means according to representations of course direction and velocity, means for operating control apparatus in accordance with predetermined proximity of said pen carriers, transfer switching means responsive thereto for interchanging the course control of said motive means and reversing the course tracing functions of said pens, means also operable according to a pen proximity position for lifting said pens from the chart, one of said pens being lifted a greater distance so as to clear the other pen, and retarding means for delaying the lowering of said pens during said control transfer.

16. Apparatus for multiple course recording comprising a chart, a plurality of recording pens for tracing respective contemporaneous courses on said chart, actuating means for said pens, means for controlling said actuating means according to respective course variations, and transfer control means responsive to proximity positions of said pens at concurrence or intersection of said courses, said transfer means including circuit control means operable to energize a first relay in accordance with a proximity position of said pens, a switching relay for causing interchange of course control for said actuating means whereby the functions of said pens are interchanged, and means for energizing said switching relay in accordance with alternate operation of said first relay.

17. In multiple course recording apparatus having a chart and a plurality of course tracing pens, operating means for each pen comprising a pen carrier, a motor for moving said carrier with respect to said chart along one axis of a Cartesian coordinate record system, a motor for moving said pen with respect to said carrier along another axis of said system, said pen being slidable on a rockable shaft mounted on said carrier, means for energizing the respective motors according to representations of course direction and velocity, sensing means responsive to predetermined proximity of said pen carriers, transfer switching means responsive to said sensing means for interchanging the course control of aid motors thereby reversing the course tracing functions of said pens, pen lifting means also responsive to said sensing means for rocking at least one of said shafts to lift the respective pen from the chart, and retarding means for delaying the lowering of said pen during said control transfer.

18. Apparatus for multiple course recording comprising a chart, a plurality of recording pens for tracing respective courses on said chart, actuating means for each pen, means for producing control quantities representing the instant coordinate positions of each course in a coordinate reference system, means responsive thereto for controlling said actuating means according to respective course variations, and transfer control means responsive to the relative positions of said pens at concurrence or intersection of said courses for causing interchange of control of said actuating means whereby the functions of said pens are interchanged, said transfer means including means for comparing control quantities representing respective coordinate values of said instant positions with respect to a given axis.

19. Apparatus for multiple course recording comprising a chart, a plurality of recording pens for tracing respective courses on said chart, actuating means for each pen, means for producing control voltages representing the instant coordinate positions of each course in a coordinate reference system, means responsive thereto for controlling said actuating means according to respective course variations, and transfer control means responsive to the relative positions of said pens at concurrence or intersection of said courses for causing interchange of control of said actuating means whereby the functions of said pens are interchanged, said transfer means including electronic means for comparing the control voltages representing instant coordinate values of said positions with respect to a given axis, and switching means responsive to said electronic means and operable according to the resultant voltage.

20. In multiple course recording apparatus having a chart and a plurality of course tracing pens, operating means for each pen comprising a pen carrier, electric motive means for moving said carrier along one axis of a Cartesian coordinate reference system, electric motive means for moving said pen with respect to said carrier along another axis of said system, means for energizing the respective electric motive means according to representations of course direction and velocity, means for operating a control circuit in accordance with comparative values of the respective coordinates of the instant positions of said pens with respect to said first-named axis, and transfer control means responsive thereto for switching the controls of all said motive means and reversing the course tracing functions of said pens.

References Cited in the file of this patent

UNITED STATES PATENTS

| | | | |
|---|---|---|---|
| 1,985,265 | Smith | Dec. 25, | 1934 |
| 2,224,182 | Crooke | Dec. 10, | 1940 |
| 2,415,880 | Hassler | Feb. 18, | 1947 |
| 2,475,314 | Dehmel | July 5, | 1949 |
| 2,569,817 | Wolf et al. | Oct. 2, | 1951 |
| 2,587,145 | Grib | Feb. 26, | 1952 |
| 2,596,305 | Stevens | May 13 | 1952 |